June 24, 1930.　　　　J. G. SNIP　　　　1,768,010
AUTOMATIC STOP SIGNAL
Filed Sept. 13, 1929　　2 Sheets-Sheet 1
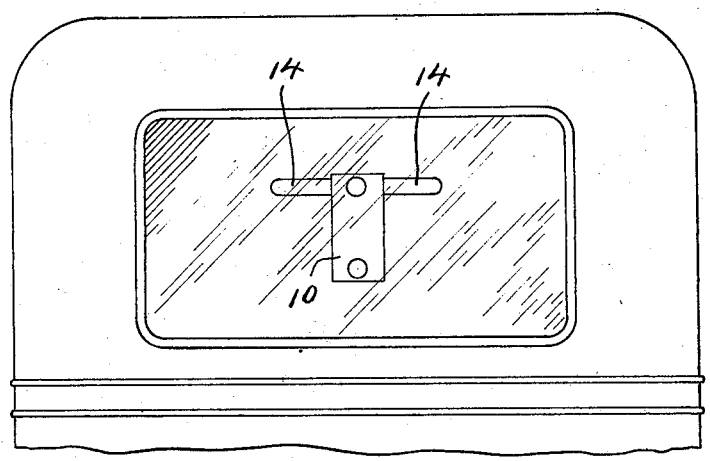
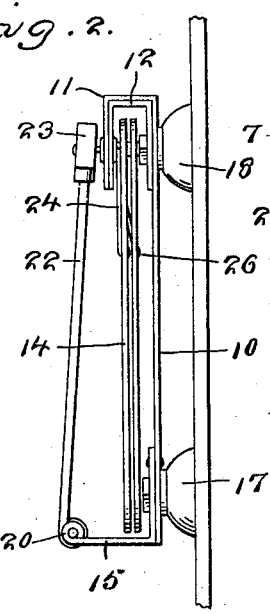
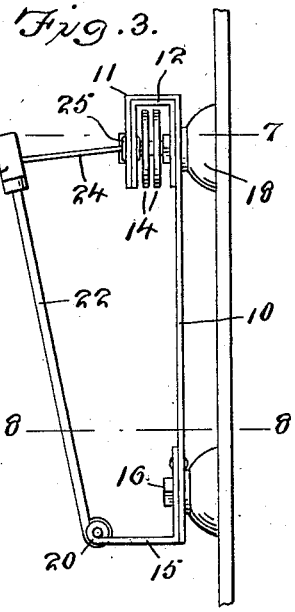
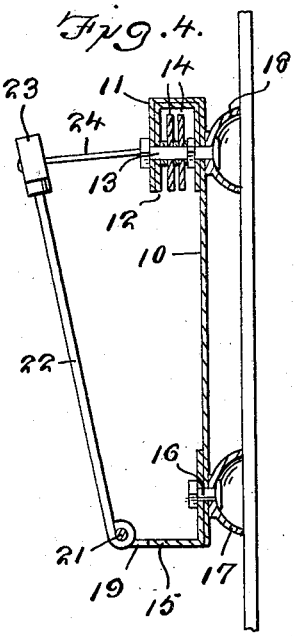
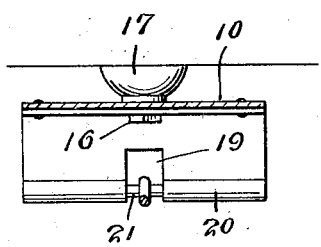
John G. Snip
INVENTOR
BY Victor J. Evans
ATTORNEY

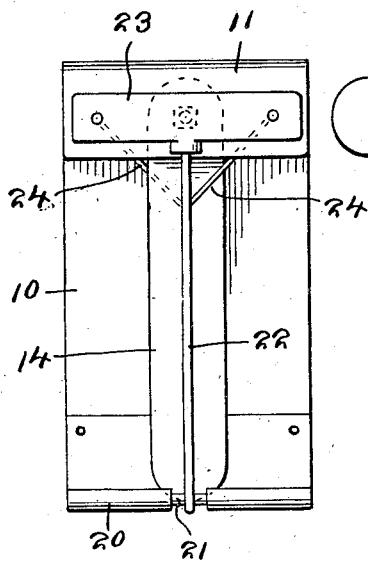
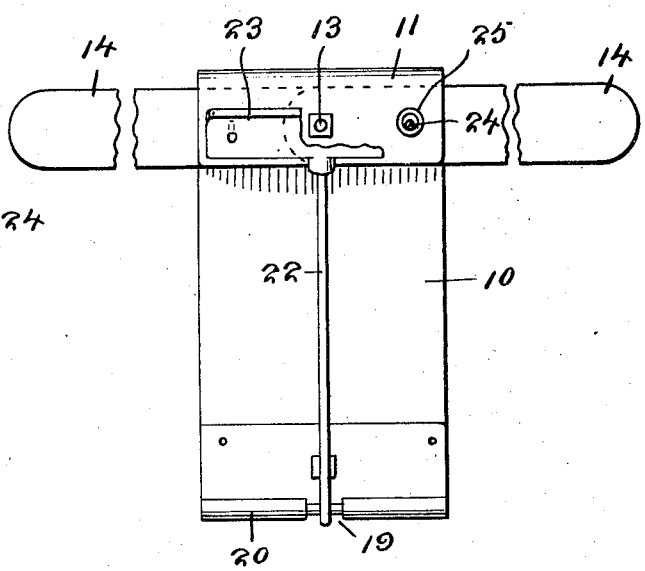
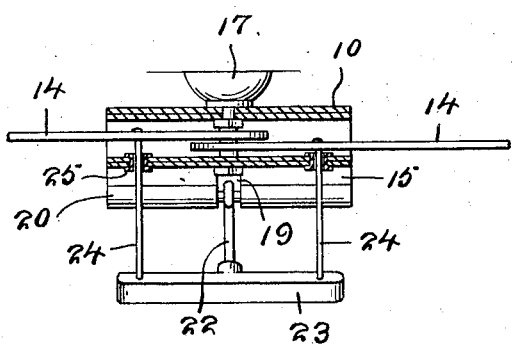
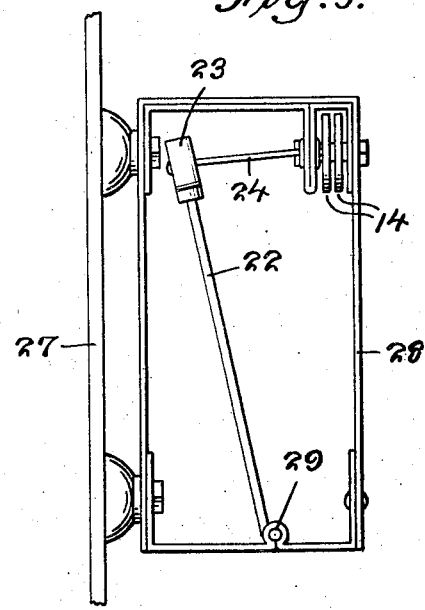

Patented June 24, 1930

1,768,010

UNITED STATES PATENT OFFICE

JOHN G. SNIP, OF LAMAR, MISSOURI

AUTOMATIC STOP SIGNAL

Application filed September 13, 1929. Serial No. 392,409.

This invention relates to signal devices, an object being to provide a normally inactive signal which may be attached to a vehicle and automatically moved to signalling position as the speed of the vehicle is slackened, and automatically returned to normal position when the speed is increased, or when the vehicle is stopped.

Another object of the invention is the provision of a signal which may be attached to the rear window or to the windshield of an automobile, so as to be plainly seen from all directions.

With the above and other objects in view, the invention further includes the following novel features and details of construction, to be hereinafter more fully described, illustrated in the accompanying drawings and pointed out in the appended claims.

In the drawings:—

Figure 1 is an elevation showing a portion of the rear of an automobile with the invention applied.

Figure 2 is an enlarged view showing a fragmentary portion of the window of the automobile with the invention applied and the parts in normal position.

Figure 3 is a view similar to Figure 2 with the signal in an active position.

Figure 4 is a sectional view with the parts in the position shown in Figure 3.

Figure 5 is an elevation with the parts in the position shown in Figure 2.

Figure 6 is a like view with the signal devices extended.

Figures 7 and 8 are sectional views taken respectively on the lines 7—7 and 8—8 of Figure 3.

Figure 9 is a view similar to Figure 2 showing a slightly modified form of the invention attached to the windshield of a vehicle.

Referring to the drawings in detail wherein like characters of reference denote corresponding parts, the reference character 10 indicates a supporting member which may be made of any suitable material such as celluloid, preferably opaque. The base may be colored green and may be provided at its upper edge with a flange 11 which is spaced from the base and suitably reinforced as shown at 12. A shaft 13 extends through this flange and through the base and forms a pivot mounting for a pair of signal devices or arms 14. The inner ends of these arms are mounted upon the shaft 13 and as the shaft is positioned centrally of the width of the base, the arms normally occupy a retracted position so as not to be visible from the rear of the vehicle.

Secured to the lower edge of the base 10 is an angle plate 15 which acts to reinforce and stiffen the base and which has extending therethrough a fastening device 16 for the attachment of a suction cup 17. A similar suction cup 18 is mounted upon the shaft 13 at the upper end of the base 10.

The angle plate 15 is notched as shown at 19 and is rolled upon opposite sides of this notch as shown at 20 to receive a rod or bar 21. Pivotally mounted upon this rod or bar is one end of an arm 22, the upper end of which carries a cross arm or weight 23. The opposite ends of this cross arm or weight 23 are connected with the signal devices 14 by means of cords or flexible members 24. These cords or flexible members pass through eyes 25 provided in the flange 11 and have their extremities secured to the signal devices 14 as shown at 26.

The pivotal connection of the arm 22 with the angle plate 15 is so spaced from the base 10 that when the signal is secured to the rear window of the automobile the weight or cross arm 23 will be beyond the vertical line of the pivotal connection. The weight will thus rest against the flange 11 as shown in Figure 2 of the drawings. The weight will remain in this position while the vehicle is stationary or when the vehicle is started and moved in a forward direction. As soon as speed of the vehicle is slackened however the weight 23 will continue to move forward ahead of the speed of the vehicle, whereupon the flexible connections 24 will swing the signal devices 14 outward upon the pivot or shaft 13 so as to indicate the slackening of the speed of the vehicle. As soon as the vehicle stops, or the speed is increased, the weight 23 will resume its normal position against the flange 11 and the signal device will drop.

The device may be also secured to the windshield 27 of a vehicle. For this purpose a frame 28 is substituted for the base 10 and the signal devices 14 and the arm 22 and weight 23 are mounted within the frame as shown in Figure 9. The arm 22 is pivotally mounted within the frame as shown at 29. Normally, the signal devices 14 are lowered and when the speed of the vehicle slackens, the weight 23 will continue to move forward as previously described so that the flexible members 24 will move the signal devices outward.

It is apparent from the foregoing description and accompanying drawings that the invention may be manufactured and sold at a low cost, so that the invention is especially adapted for use as an advertising medium.

The invention is susceptible of various changes in its form, proportions and minor details of construction and the right is herein reserved to make such changes as properly fall within the scope of the appended claims.

Having described the invention what is claimed is:—

1. A vehicle signal comprising a support, means for securing said support to a vehicle, a shaft located at one end of said support, signal arms journaled to said shaft and normally depending downwardly therefrom and hidden from view by said support, a rod hinged to the lower end of said support and normally extending upwardly and inwardly relative to said support, a weight carried by the upper end of said rod and connected to said arms to swing the rod outwardly from said support and to swing the arms horizontally and in view by the slackening of speed of the vehicle.

2. A vehicle signal comprising a support, a shaft located at the upper end of said support, signal arms journaled to said shaft and normally depending downwardly therefrom and hidden from view by said support, a rod hinged to the lower end of said support and normally extending upwardly and inwardly relative to said support, flexible elements connected to the arms and guided by said support, and a weight secured to the upper end of said rod and to said flexible element to swing said arms horizontally in view by the slackening of speed of a vehicle.

3. A vehicle signal comprising a support, upper and lower flanges carried by said support, a shaft carried by said upper flange and support, signal arms carried by said shaft and having signalling and non-signalling positions and hidden from view by said support when in non-signalling position, a second shaft journaled to said lower flange, a weight operated rod secured to said second shaft, and flexible elements connected to said rod and to the arms and guided by said upper flange to move said arms from one position to another position by the action of said rod.

4. A vehicle signal comprising a support, upper and lower flanges carried by said support, said upper flange having guide openings, a shaft carried by said upper flange and support, signal arms carried by said shaft and having signalling and non-signalling positions and hidden from view by said support when in non-signalling position, a second shaft journaled to the lower flange, a weight operating rod secured to said second shaft, and flexible elements connected to said rod and extending through the openings and connected to said arms to move the latter from one position to another position by the action of said rod, and vacuum cups to secure said support to a panel of a vehicle.

In testimony whereof I affix my signature.

JOHN G. SNIP.